United States Patent Office 3,397,144
Patented Aug. 13, 1968

3,397,144
CONTROL OF MICRO-ORGANISMS IN
INDUSTRIAL PROCESS WATERS
David Yi-Lan Liu, Sao Paulo, Brazil, assignor to Nalco
Chemical Company, Chicago, Ill., a corporation of
Delaware
No Drawing. Continuation-in-part of application Ser. No.
285,251, June 4, 1963. This application Mar. 21, 1967,
Ser. No. 624,727
13 Claims. (Cl. 210—62)

ABSTRACT OF THE DISCLOSURE

A method of inhibition and control of microorganisms in industrial process water systems through the use of water-soluble organic haloester-alcohol compositions.

This application is a continuation-in-part of my co-pending application U.S. Ser. No. 285,251, filed June 4, 1963 now abandoned.

The disclosure

The inhibition and control of the growth and reproduction of micro-organisms in aqueous recirculating waters in industrial processes has long been recognized as a particularly burdensome problem. The environment of the aqueous medium itself is often extremely conducive to rapid multiplication and growth of these undesirable micro-organisms. Only through the use of carefully tailored microbiocidal compositions can the growth and reproduction of these undesirable organisms be controlled reliably without detriment to the process in which the water is used. Without effective control, loss of product, inferior product, production-time loss, and the other types of expensive problems may occur in the system.

The particular problems inherent in the microbiological control of an aqueous fluid medium are vastly different than those involving control of other harmful organisms in environmental conditions other than that of water. For example, many times a chemical is rendered completely inactive by the particular surrounding media containing the undesirable microorganisms. Compounds such as ethylene oxide and beta-lactone, which are well-known fungicides, are completely or nearly completely inactive in aqueous media with regard to inhibition of growth and reproduction of the micro-organisms contained therein.

General considerations of antimicrobic agents and processes reveal that efficient control of each specific type of micro-organism growth, requires a specific chemical-physical type of treatment. The choice of the active chemical and/or the method of application depends upon the system to be controlled. Different biocidal processes and antibiotic chemicals cannot legitimately be equated in a general manner.

Many broad classes of biocidal agents are known to the art. It is also known that antiseptics, nematocides, disinfectants, fumigants, fungistats, fungicides, preservatives, chemical and physical sterilants, and pasteurization agents must all be particularly designed to obviate the specific problem at hand. The inherent chemical make-up of each class of composition intrinsically depends upon the organisms to be controlled and medium in which they are contained. Physical form, in addition to chemical configuration, may also be important. For example, in the control of insects, the particular chemical must normally be low boiling and capable of volatilization in order to contact the undesirable pest. In like manner a fumigant must have a high degree of toxicity to insects in all stages of their life cycle.

One problem in the broad spectrum of microbiological control is that of industrial process water systems. This is the problem solved by the instant invention. In order to economically utilize the aqueous industrial process media, it is often necesasry to recirculate it in a continuous manner over long periods of time. This recirculation causes many difficult problems, among which is the gradual build-up and accumulation of undesirable micro-organisms in the aqueous fluid. Various species of bacteria and fungi are favorably produced in such an environment of recirculating use.

One of the most acute industrial biological control problems is that in papermill water systems which contain aqueous dispersions of paper-making fibers. The uncontrolled build-up of microbiological slime due to the accumulation of micro-organisms, causes off-grade production, increased maintenance costs, decreased production because of breaks, and the requirement of more frequent wash-ups and excessive raw material usage. For example, slime deposits result in contamination of the stock by deposition thereon with consequent breaks in the subsequently formed sheets. It has been discovered that chemical control of these micro-organisms will obviate the problems recited above. Application of selected slimicides to strategic locations throughout the paper-making process, achieves good control and does away with potentially troublesome conditions.

In the papermill industry itself the widespread adoption of closed white water systems creates especially severe operating conditions, since this system lends itself to accumulation of slime deposits by virtue of the continuous recycling of the white water. In order to overcome the problems created by the presence of slime in these closed white water systems, paper manufacturers have for a long time been seeking slime control agents which not only keep slime in abeyance by inhibiting its growth, but also effect a kill and inhibit initial slime formation by impairment of a vital function of slime-forming organisms, namely, reproduction.

A typical closed white water papermaking process may generally be thought to include the following steps:
 (1) Stock preparation;
 (2) Formation of a wet web by filtration and vacuum, and;
 (3) Removal of the water from the formed web or sheet by pressing and heat.

The various pulps such as unbleached groundwood, unbleached sulphite, bleached sulphite, unbleached kraft and Mitscherlich, semi-bleached kraft, etc., prepared by well-known processes, are then subjected to the desired mechanical treatment, generally known as stock preparation. This step includes processing such as slushing, beating and refining. Slushing or dispersing the fibers in water may be done in such machines as a hydrapulper. The stock suspension is later subjected to beating and refining, that is, cutting processes to increase fiber surface and flexibility, and decrease fiber lengths. A typical refining operation is carried out in a Jordan Conical Refiner.

The second general process step of arrangement of the fibers in suspension into a wet web is normally effected by a Fourdrinier or cylinder machine. In general a Fourdrinier machine is preferred and will be described below. This step consists of flowing the dilute suspension of fibers evenly onto a surface of a continuous belt of wire cloth. The water of the web is removed by gravity, suction, and pressure. However, before the stock suspension is formed on the wire cloth it is placed in a machine chest to provide the necessary reserve needed for machine operation and to regulate the flow. The suspension of fibrous material is transported from the machine chest to the headbox, the latter converting the flow into a flat stream and then to a slice wire which controls the stream and therefore the sheet thickness.

The water leaving the wire of the Fourdrinier machine is commonly known as white water and is caught on trays underneath the machine. In order to recover fibers and other solids from this white water it is necessary to employ a so-called Saveall type of recovery. This may include such processes as filtration, flotation, and sedimentation. An example of a flotation process involves the use of a Sveen Saveall. Here, white water is treated with a chemical such as glue whereby the fibers are caused to adhere to each other and are subsequently skimmed off the surface of the water.

The complexity of the above system coupled with the favorable growth conditions for micro-organisms through the use of recirculating water, causes slime masses to thrive and form throughout the various individual parts of the system. Particularly troublesome areas are corners of equipment, areas of poor stock flow, and high density storage sites. These slime masses prevent normal flow of stock suspension, make the stock lumpy, and prevent normal sheet formation.

Generally, papermill systems contain from 0.1% to 15% by weight of cellulosic fiber material in the form of an aqueous pulp. Such an aqueous pulp medium is potentially conducive to the growth of such bacteria as *Pseudomonas aeruginosa, Aerobacter cloacae, Streptococcus faecalis, Bacillus pumilus, Micrococcus pyogenes, Bacillus subtilis, Aerobacter aerogenes, Bacillus mycoides, Desulfovicbrio desulfuricans,* Clostridia, and fungi such as *Penicillium glaucum,* Cephalosporium, *Aspergillus terreus,* Trichoderma and *Aspergillus niger.*

Another use of water in industry is that of an efficient cooling media for industrial cooling towers, air conditioning equipment, internal combustion engines, and the like.

Since heat may be easily and economically removed by water in such systems as evaporative cooling towers, these systems have been widely adopted in many industries. Again the water used in such systems is recirculated, thus complicating the problem of microbiological control. The micro-organisms that accumulate in the towers impair their efficiency with respect to heat exchange. Slime build-ups also result in large adherent masses which plug equipment and restrict flow. These same micro-organisms cause deterioration of cooling tower lumber by selective removal of cellulose from the surface. It has been found that even small amounts of nutrients found in cooling tower systems support these micro-organisms in their reproduction and defeat control efforts. Solution of this specialized and difficult industrial problem not only requires use of effective chemicals to control micro-organisms, but in addition these same chemicals must possess a sufficiently high vapor pressure so a not to be carried off and create a potential hazard to those working in the area.

One approach to the problem of control of microorganisms in industrial process waters has been effected through the use of a combination of chemical treating agents. It would be an advantage to the industry to discover a class of chemical useful as a single reagent for inhibition and control of undesirable micro-organisms in aqueous media, without subsequent addition of other treating agents. Another advantage to the industry would be the creation of chemicals which, while effective as biocides and biostats in aqueous media, nevertheless are relatively non-volatile, non-toxic to humans, easily handled, and may be injected into the system to be treated with a minimum of effort and special equipment.

The primary object of employment of microbiocidal chemicals in industrial process water systems is to continuously protect the system itself from slime accumulation and other accumulated masses of materials caused by bacterial growth which will impede the operation of the system. Therefore, it is extremely advantageous to employ water-soluble microbiocides for such control work. This is especially critical in industrial process water systems of the recirculating type. Some problems of considerable magnitude result in use of water-insoluble microbiocides. While these substances may have passable activity as microbiocidal treating agents, it is sometimes difficult to apply them initially and obtain some type of passable dispersancy in the aqueous system to be controlled without resort to use of solvents. Likewise, these substances have a tendency to accumulate in large amounts in certain areas due to the lack of water dispersibility, and efficient control of all the various operations and equipment in the overall industrial process water system is not achieved. Many times, in a recirculating type of operation, the water-insoluble microbiocide is carried through to discharge areas and/or deposited in only a few areas without offering protection to the system as a whole entity.

Another serious problem occurs through use of water-insoluble microbiocides in that these materials are sometimes deposited upon the cellulosic fibers or other product being processed in the aqueous system, and thereby carried through as undesirable toxicants intimately admixed with the composition of the final produced article. In some cases the thus induced toxicity of the article makes it undesirable for ultimate consumer use, such as for example, paper materials used as food wraps and the like. Therefore, through use of water-soluble microbiocides not only is the system effectively protected in all areas, with the chemical treating agent remaining effective even under conditions of recirculation of the industrial process water, but also the above enumerated toxicity problems with respect to the final formed product are thereby overcome.

It would also be useful if such a water-soluble microbiocidal agent could be found to adequately control micro organisms of the type occurring not only in the aqueous paper, pulp and cooling water systems described above, but also in other aqueous media such as oil-field water flood treatments and the like.

Not only is it extremely desirable that chemicals be found which are able to control a number of harmful species of micro-organisms in the particular aqueous industrial system, but it is also desired that these same treating agents have activity over a wide pH range. It is further desired that these same chemicals not be readily affected by the particular aqueous medium in which the micro-organisms are contained, but rather possess the ability to kill, inhibit, and control micro-organisms before being chemically or physically modified. It would be a valuable contribution to the art therefore if a water-soluble class of micro-biocides could be discovered for effective, efficient biocidal use in all types of aqueous environments and could be employed without creation of any of the above discussed subsidiary problems.

It, therefore, becomes an object of this invention to provide a class of water-soluble microbiocidal agents stable in aqueous media which are effective in controlling the micro-organisms contained in industrial process water systems.

Another object of the invention is to provide an effective method of inhibition and control of growth and reproduction of undesirable micro-organisms contained in a myriad of differently constituted aqueous fluid media.

Still another object is to provide a multi-purpose class of chemicals which will inhibit and control micro-organisms in industrial process water systems without resort to combinations with other treatment agents, and which will cause little toxicity hazard to the operator of such systems.

A specific object is the control of papermill slime deposits through the use of water-soluble microbiocidal chemicals, and particularly to provide a method of microbiocidal inhibition useful in such specific papermill systems as a closed white water system.

Yet another object is the protection of cooling tower systems from build-up of micro-organisms which may undesirably produce loss of heat exchange capacity, by use of an effectively active group of water-soluble compositions which do not tend to escape from the treated system.

Yet another object is to provide a specific class of water-soluble chemicals for use in a method of microbiocidal control of aqueous systems, which chemical treating agents are not carried through the system to the final formed article, thus obviating any toxicity problems which may arise particularly in consumer use of the article.

Other objects will appear hereinafter.

The invention

In accordance with the invention, it has been discovered that the control and inhibition of the growth and reproduction of micro-organisms in industrial process waters may be effected by the incorporation therein of a water-soluble organic halomonoester alcohol. These esters, normally synthesized from a halogenated acid and a polyhydroxy alcohol, may be chosen from a number of chemicals. For example, the acid reactant itself may be polyhalogenated or contain a single halogen atom. The alcoholic moiety of the ester reagent may be derived from such polymeric polyalcohols as polyvinyl alcohol, and such alcohol-ethers as polyoxyalkylene glycols of varying molecular weights and chain lengths, as well as from monomeric polyalcohols of various types including synthetic compounds and naturally-occurring substances such as sugars, etc. In any case a primary essential is that the formed halomonoester alcohol be water-soluble. By the term "water-soluble" is meant the physical characteristic of the microbiocides of the invention to be solubilized, dispersed or colloidally suspended in at least use amounts in the aqueous system to be controlled.

Preferred ester-alcohol compounds correspond to the type-formula:

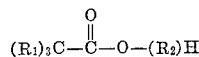

where $R_1$ is selected from the group consisting of halogen, hydrogen, lower alkyl, and lower halogenated alkyl. It is preferred that when $R_1$ is an alkyl or halogenated alkyl radical, it should contain no more than 6 carbon atoms and most preferably no more than 3 carbon atoms. Thus, such lower alkyl groups as methyl, ethyl, propyl, isopropyl, butyl, isobutyl, secondary butyl, tertiary butyl, amyl, isoamyl, and halogenated derivatives of any of the foregoing may be employed. Also, at least one occurrence of $R_1$ must be halogen or a halogenated alkyl radical such as bromide, chloride, etc., or alkyl radical containing such halogen. $R_2$ is a radical selected from the group consisting of lower alkoxy and lower hydroxy alkoxy polyethers. Again, it is greatly preferred that the number of carbons in such radicals or in each recurring polyether unit, be less than 6 in number, and most preferably 3 or less. Thus, by the term "lower" whether applied to alkyl, alkoxy, hydroxy alkoxy, halogenated alkyl, or alkyl polyether radicals, is meant a substituted or unsubstituted hydrocarbon radical containing preferably from 1 to 6 carbon atoms and more preferably from 1 to 3 carbon atoms. The most preferred lower hydrocarbon radicals are groups containing either 2 or 3 carbon atoms. The carbon atoms, of course, need not necessarily be arranged in a straight chain configuration and the radicals may also have branched hydrocarbon radicals proceeding from their main or primary chain.

The more preferred water-soluble organic haloester alcohols have been found to fall within the following type-formula:

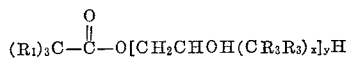

where $R_1$ is a radical of the type defined above, $R_3$ is selected from the group consisting of hydrogen, lower alkyl radicals, hydroxy and lower hydroxy alkyl radicals, $x$ is an integer of from 0 to 1, and $y$ is an integer from 1 to 8. Generally, when $x$ equals 1, $y$ will also equal 1. Again, when $R_3$ is a hydrocarbon radical, whether an alkyl group, substituted alkyl group, or a repeating alkyl ether group, it should contain less than 6 carbon atoms and most preferably less than 3 carbon atoms as discussed above. In this formula only one occurrence of $R_3$ may be hydroxy.

The most preferred haloesters have been found to fall within the following specific type-formula:

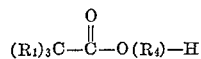

where $R_1$ is a radical as defined above, and $R_4$ is a radical selected from the group consisting of $CH_2CH_2O$, $CH_2CHOHCH_2$ and $(CH_2CH_2O)_z$, where $z$ is an integer ranging from 2 to 8.

By treating industrial process waters with the above haloester alcohols, the invention is directed to providing a microbiologically controlled industrial process water which comprises a major portion of an aqueous liquid and a minor portion of at least a microbiocidally active amount of an alcohol corresponding to any of the above type formulae. Excellent microbiological control of such treated water is obtained even for long periods of time and under conditions of recirculation.

While the haloester alcohols may contain a varying number of atoms of different halogens, it is preferred that these materials contain bromine as the halogen constituent and most preferably a single bromine atom. Materials of this type have a low degree of toxicity and from a standpoint of manufacturing and handling ease are particularly suitable for use in the invention.

It has been discovered that the corresponding di-ester compounds formed from the same reactants used in formation of the monoesters do not have the requisite water solubility. They thus have certain inherent use disadvantages such as build-up or accumulation in a specific few areas of equipment of the industrial process water system, and loss of dosages in a recirculating type water system. In addition, many water-insoluble di-esters as well as water-insoluble monoesters are extremely lacrymatory and can be handle only with difficulty, if at all. Also, such di-esters have a tendency to adhere to the processed product and are thus intimately admixed with the final formed article. In many cases, such as in the case of paper products used as wrappings for food, approved toxicity limits for such paper articles may be exceeded. This may well even preclude the use of such water-insoluble materials. Also, due to lack of dispersability in the aqueous industrial process water system, these water-insoluble derivatives are not immediately available for use, and are often only slowly released into the aqueous media, thus affording little, if any, immediate protection to the system and particular equipment employed. Thus, in a paper mill system, deleterious amounts of slime material may quickly build up and cause off-grade production, production slowdowns, contamination of stock by slime deposition, breaks in the subsequently formed paper sheets, etc. These problems are obviated through use of water-soluble derivatives of the invention.

Specific organic water-soluble monohaloesters useful in the process of the invention are set forth in Table I. The most preferred materials are

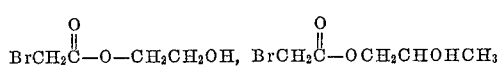

and

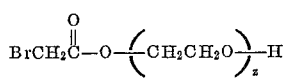

where $z$ is an inetger ranging from 2 to 8.

TABLE I

| Composition No. | Chemical Name |
| --- | --- |
| 1 | 1-bromoacetoxyethanol-2. |
| 2 | 1-bromoacetoxypropanol-2. |
| 3 | 1-bromoacetoxypropanol-3. |
| 4 | 1-chloroacetoxypropanol-3. |
| 5 | 1-chloroacetoxy-2-methylethanol-2. |
| 6 | 1-chloroacetoxyethanol-1. |
| 7 | 1-chloroacetoxypropanol-2. |
| 8 | 1-bromochloroacetoxyethanol-2. |
| 9 | 1-bromochloroacetoxyhexanol-6. |
| 10 | 3-chloro-2,2-dibromopropionoxybutanol-4. |
| 11 | 1,1-dibromoacetoxyethanol-2. |
| 12 | 2,2-dibromopropionoxybutanetriol-1. |
| 13 | 2,3-dibromopropionoxyethanol-2. |
| 14 | 2-dichlorobromoacetoxyethanol-1. |
| 15 | 1,1-trichloroacetoxyethanol-1. |
| 16 | 1,1,1-tribromoacetoxyethanol-1. |
| 17 | 1-iodoacetoxyethanol-1. |
| 18 | 1-fluoroacetoxyethanol-1. |
| 19 | $CH_2BrC(=O)-O-(-CH_2CH_2O-)_3H$ |
| 20 | $CH_2BrC(=O)-O-(-CH_2CH_2O-)_6H$ |
| 21 | Reaction product of polyvinylalcohol and bromo acetic acid. |
| 22 | Reaction product of glucose and bromo acetic acid. |
| 23 | Bromoacetoxypentaerythritol-1. |
| 24 | $CH_2BrC(=O)-O-(-CH_2CH_2O-)_2H$ |

As previously discussed, the above type compounds are most often conveniently formed by known esterification reactions involving a polyhydroxy compound and a halogenated carboxylic acid reactant. Generally, to form the monoester composition it is necessary to use excesses of the polyhydroxy reactant.

The method of inhibition of growth and reproduction of microbiological organisms in industrial process water systems broadly comprises the steps of treating such systems by adding to them at least a microbiocidal amount of a composition which comprises a water-soluble halomonoester alcohol, preferably corresponding to any of the above recited formulae. The amount of monoester alcohol required to achieve control of the microorganisms will, of course vary depending upon the particular system treated, as well as the types of species found present. In most cases, as little as 0.1 p.p.m. to 25 p.p.m. will give adequate control, although quantities ranging as high as 1000 p.p.m. may be necessary in some cases. Small additive quantities of the chemical are extremely effective in industrial process systems where the water is recirculated and re-used. In these systems the quantity of the chemical will gradually build up to a maximum usable and effective treating dosage, which may be calculated knowing the specific factors in each particular system.

The invention is particularly useful when the chemical treating agents are added to papermaking systems and industrial cooling water systems. A water system which can betreated with particular success by the above process is a closed white water system. However, slime-producing organisms in any papermaking process water system may be generally inhibited by the use of the compositions of the invention. Particularly, however, excellent biostat activity by the halomonoester alcohols is shown in inhibiting growth and reproduction of *Flavobacterium brevis, Aerobacter aerogenes, Desulfovibro desulfuricans,* Clostridia and *Aspergillus niger.*

It has been determined that when the chemicals of the invention are used in paper mill systems and particularly in closed white water paper mill systems, the amount of chemical used in effectively controlling the microorganisms contained therein may vary from 0.01 to 10 pounds per ton of paper pulp. More preferably, the chemical is added in amounts from 0.1 to 5 pounds per ton of pulp.

The water-soluble monoester alcohols may be added to the aqueous system to be controlled in neat form, or in an aqueous or polar organic solution. Liquid solutions of the ester alcohols may contain other components such as dispersants and the like. For example, polyoxyalkylene adducts of long-chained aliphatic amines or alcohols may be suitably employed as dispersants. A typical compound of this type is known and trademarked as "Sterox AJ." In some cases, if an excess of polyhydroxy alcohol is used in synthesizing the monoester, the reaction product as such, containing excess alcohol as solvent, may be directly employed in treating the aqueous industrial process system without separation and purification of the active ingredient. No activity loss was noted in such a case.

If desired, chemical briquette absorbents such as soda ash, dextrine, and the like may be prepared in conjunction with the ester alcohols so that solid materials are produced for direct feeding into the aqueous system with conventional briquette feeding equipment.

Evaluation of the invention

In order to determine the efficacy of the invention for treating various types of industrial process waters under a wide variety of conditions, the following test method was used. This test method correlates with the conditions existing in many industrial process systems where microbiological problems occur. This test method is set forth in detail below:

TEST METHOD

Gas tube and growth inhibition

The culture medium used consisted of 24 grams of dextrose, 1 gram of Basaminbact (Anheuser Busch), added to one liter of Chicago tap water and sterilized by autoclaving under 15 pounds of pressure for 15 minutes. The final pH of the autoclaved medium was 6.8±0.1. An appropriate amount of 18 to 24 hour nutrient broth culture of *A. aerogenes* or spore suspension of *A. niger* was mixed with 220 ml. of the culture medium immediately before starting tests, to give the inoculated culture medium having one million organisms per ml. of medium. This inoculated culture medium was placed in each of a series of fermentation tubes with caps which contained the appropriate concentration of test chemical to give a final volume of test chemical and culture medium of 20 ml. in each tube. For this purpose the maximum volume of chemical introduced should be 0.5 ml. per tube to avoid chemical-solvent interference. Many solvent carriers of active materials are themselves somewhat effective, and efficient comparative testing requires that only small amounts of these solvents be introduced into the culture medium. The chemical and the inoculated medium were mixed gently. Two control tests were also run, one in which the chemical was omitted, and the second in the absence of inoculum. In mixing, tubes were inverted in the *A. aerogenes* gas inhibition study so as to fill the gas detection vials. The *A. niger* fungal growth inhibition study tubes were shaken. Inhibition ranges for *A. aerogenes* were determined by noting the presence or absence of gas production in the gas vials after 48 hours incubation of tubes at 98° F. The *A. niger* test tubes were incubated for 5 days at 86° F. and inhibition levels were determined by noting presence or absence of growth in the tubes at the end of this period of time.

Using the above-described chemical synthesis and inhibition test method, several typical compositions of the invention were prepared and their activity determined. Results are reported as parts of chemical treating agent necessary to effectively inhibit one million microorganisms. These results are set forth in Table II.

TABLE II.—MICROBIOLOGICAL ACTIVITY OF HALOESTER ALCOHOLS INHIBITION RESULTS

| Composition | Inhibition Results (p.p.m.)[1] | |
| --- | --- | --- |
| | Aa+ 48 hr. Inhibition | An++ 5 days Inhibition |
| 1 | 1–2.5 | 5–10 |
| 2 | 1–2.5 | 5–10 |
| 19 | 5–10 | 10–25 |
| 20 | 5–10 | 10–25 |
| 24 | 2.5–5 | 5–10 |
| 21 | 1–2.5 | 10–25 |
| 13 | 10–25 | 1–2.5 |

[1] P.p.m.=parts of test chemical per one million.
Aa+=*Aerobacter aerogenes*—An++=*Asperigillus niger*.

The above table shows that representative halomonoester alcohols of the invention have excellent activity in inhibition of growth of both fungi and bacteria and specifically *A. aerogenes* and *A. niger*. These microorganisms are particularly prevalent in industrial process water systems and especially are prone to occur and accumulate in aqueous paper pulp being processed into paper articles. The monoester alcohols also had excellent activity in inhibiting the growth of Desulfovibrio, Clostridia, and *Flavobacterium brevis*.

Besides laboratory evaluation of the compositions of the invention, long-term paper plant field tests were also made. Test chemicals were prepared and evaluated in a closed white water paper mill system using a Fourdrinier machine which produced 60 tons of paper per day during normal operations. Discussion of the run and results is set forth in the following example.

Example

In this plant run, Composition I of Table I was tested for effectiveness at a dosage varying from 0.2 to 2.0 pounds per ton of paper pulp. The active chemical itself was added as a 30% active formulation in an alcoholic solvent. Prior use of a competitive product failed to control micro-organism activity to any appreciable extent. Various micro-organism problems thereby arose, such as stringers in surface slime build-ups on the tray areas, table roll deflectors, headbox baffle, wire pit baffles and walls, inside suction boxes, and also on Sveen Saveall walls and stand-pipes. The white water pit receiving the Sveen effluent was a particularly troublesome area to control with respect to slime build-up. Samples taken at the beater chest stock, Sveen effluent, machine chest stock at regulator box, and tray white water showed a great number of Flavobacterium (non-spore bacteria), spore-forming bacteria, and fungi type micro-organisms occurring in these areas. Samples taken at various areas from the process stream itself also showed a great number of these micro-organisms.

The equipment was shut down, cleaned and then started up again, this time being protected from slime build-up by addition of Composition I of Table I at dosages within the above stated range. Throughout the trial, daily inspections were made of surface build-ups in the tray areas and the Saveall standpipes to note for slime. It was noted that the stock lines, chest and white water system were essentially free of any slime build-ups as were the tray areas and the Saveall stand-pipes. The microorganism counts during the whole of the trial showed excellent control patterns, with only moderate microbiological involvement in surface or sub-surface build-ups. At no time was there any evidence of operation difficulties or problems such as had occurred with prior use of various chemicals. The colonies of bacteria and fungi at no time and in no area approached the number that occurred during the previous continuous run in presence of competitive material.

Three successive weeks after weekly clean-ups showed excellent slime control results when the water-soluble compounds of the invention were employed. It was noted that the biostatic water-soluble treating agent of the invention inhibited both bacterial and fungal types of microorganisms. This is an extremely important factor in treatment of industrial process water systems.

As an added advantage, it was discovered that the compositions of the invention have substantially no tendency to be absorbed on paper pulp fibers. Many prior water-insoluble substances have a tendency to be selectively absorbed on the fibers and are therefore no longer capable of effectively acting upon the slime masses.

Summary

While the water-soluble monohaloester alcohol compositions of the invention find special use in protecting paper mill water systems and industrial cooling towers, they may likewise be effectively employed in reducing and/or inhibiting growth of microorganisms in air conditioning equipment, internal combustion engines, the secondary recovery of petroleum in the process known as water-flooding, water wells, and similarly related industrial fluid systems.

It is apparent that many modifications and improvements may be made without departing from the scope of the invention which is not to be limited other than recited in the appended claims.

The expressions "microbiocidal agent" or "microbiocide," as used herein are meant to designate chemical substances which have killing and/or inhibiting action on such microorganisms as, for example, bacteria, fungi, algae, protozoa, and the like.

The invention is hereby claimed as follows:

1. The method of inhibition of growth and reproduction of microbiological organisms in industrial process water systems which comprises the steps of treating said system with at least a microbiocidal amount of a composition which comprises a water-soluble organic haloester alcohol corresponding to the type-formula:

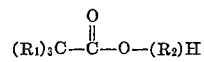

$$(R_1)_3C-\overset{O}{\underset{\|}{C}}-O-(R_2)H$$

where $R_2$ is a radical selected from the group consisting of lower alkoxy and lower hydroxy alkoxy polyethers, and $R_1$ is selected from the group consisting of halogen, hydrogen, lower alkyl, and lower halogenated alkyl, with the proviso that at least one occurrence of $R_1$ contain halogen.

2. The method of claim 1 wherein said system is treated with at least 0.1 p.p.m. of

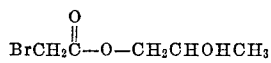

$$BrCH_2\overset{O}{\underset{\|}{C}}-O-CH_2CHOHCH_3$$

3. The method of claim 1 wherein said industrial process system is treated with at least 0.1 p.p.m. of

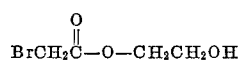

$$BrCH_2\overset{O}{\underset{\|}{C}}-O-CH_2CH_2OH$$

4. The method of inhibition of growth and reproduction of microbiological organisms in papermaking process water systems which comprises the steps of treating said system with at least a microbiocidal amount of a water-soluble organic haloester alcohol corresponding to the type-formula:

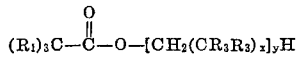

$$(R_1)_3C-\overset{O}{\underset{\|}{C}}-O-[CH_2(CR_3R_3)_x]_yH$$

where $R_1$ is selected from the group consisting of halogen, hydrogen, lower alkyl, and lower halogenated alkyl, with the proviso that at least one occurrence of $R_1$ contain halogen, $R_3$ is selected from the group consisting of hydrogen, lower alkyl radicals, hydroxy and lower hydroxyalkyl radicals, $x$ is an integer of from 0 to 1, and $y$ is an integer of from 1 to 8, with the proviso that when $x=1$, $Y=1$, with the additional proviso that only one occurrence of $R_3$ is hydroxy.

5. The method of claim 4 wherein said papermaking process water system is treated with at least 0.1 p.p.m. of

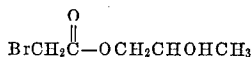

6. The method of claim 4 wherein said papermaking process water system is treated with at least 0.1 p.p.m. of

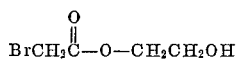

7. The method of inhibition of growth and reproduction of microbiological organisms in industrial cooling water systems which comprises the steps of treating said systems with at least a microbiocidal amount of a water-soluble organic haloester alcohol corresponding to the type-formula:

$$(R_1)_3C-\overset{O}{\underset{\|}{C}}-O-[R_4]-H$$

where $R_1$ is a radical selected from the group consisting of halogen, hydrogen, lower alkyl, and lower halogenated alkyl, with the proviso that at least one occurrence of $R_1$ contain hydrogen, and $R_4$ is a radical selected from the group consisting of $CH_2CH_2O$, $CH_2CHOHCH_2$ and $(CH_2CH_2O)_z$ where $z$ is an integer ranging from 2 to 8.

8. The method of claim 7 wherein said industrial cooling water system is treated with at least 0.1 p.p.m. of

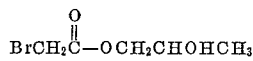

9. The method of claim 7 wherein said industrial cooling water system is treated with at least 0.1 p.p.m. of

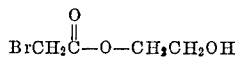

10. A slime-controlled industrial paper mill white water system which contains therein an aqueous suspension of 0.1–15% by weight of cellllosic fibers based on the weight of the system and at least a microbiocidal amount of a slime control composition comprising a water-soluble organic haloester alcohol corresponding to the type-formula:

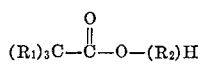

where $R_2$ is a radical selected from the group consisting of lower alkoxy and lower hydroxy alkoxy polyethers, and $R_1$ is selected from the group consisting of halogen, hydrogen, lower alkyl, and lower halogenated alkyl, with the proviso that at least one occurrence of $R_1$ contain halogen.

11. The system of claim 10 where the slime control composition is

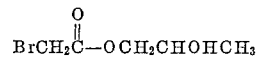

12. The system of claim 10 where the slime control composition is

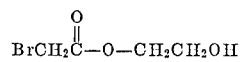

13. The method of inhibition of growth and reproduction of microbiological organisms in an industrial process water system which comprises the steps of treating the system with at least a microbiocidal amount of a composition which comprises a water-soluble organic haloester alcohol corresponding to the type-formula:

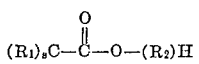

where $R_2$ is a radical selected from the group consisting of lower alkoxy and lower hydroxy alkoxy polyethers, and $R_1$ is selected from the group consisting of halogen, hydrogen, lower alkyl, and lower halogenated alkyl, with the proviso that at least one occurrence of $R_1$ contain halogen, wherein the microbiological organisms are members of the group consisting of *Flavobacterium brevis, Aerobacter aerogenes, Desulfavibro desulfuricans,* Clostridia and *Aspergillus niger*.

References Cited

UNITED STATES PATENTS

| | | | |
|---|---|---|---|
| 2,732,303 | 1/1956 | Morgan et al. | 260—487 X |
| 2,821,546 | 1/1958 | Senkbeil et al. | 260—487 |
| 3,151,020 | 9/1964 | Cruickshank | 162—190 |
| 3,017,319 | 1/1962 | Rader | 162—161 |

MICHAEL E. ROGERS, *Primary Examiner.*